19-55.n 52

R. A. L. McCURDY.

Cotton Gin.

No. 379.

Reissued July 15, 1856.

N. PETERS, Photo-Lithographer, Washington, D. C.

19-5523

UNITED STATES PATENT OFFICE.

DAVID G. OLMSTEAD, OF VICKSBURG, MISSISSIPPI, ASSIGNEE OF R. A. L. McCURDY, OF SABINE PARISH, LOUISIANA.

IMPROVEMENT IN COTTON-GINS.

Specification forming part of Letters Patent No. 13,131, dated June 26, 1855; Reissue No. 379, dated July 15, 1856.

*To all whom it may concern:*

Be it known that R. A. L. McCURDY, of Sabine parish, in the State of Louisiana, has invented a new and useful Improvement in Cotton-Gins, and that I, D. G. OLMSTEAD, of Vicksburg, in the county of Warren and State of Mississippi, am assignee of the sole right and title to said invention; and I do hereby declare that the following is a full and exact description thereof, reference being had to the accompanying drawings, making part of this specification—

Figure 1:
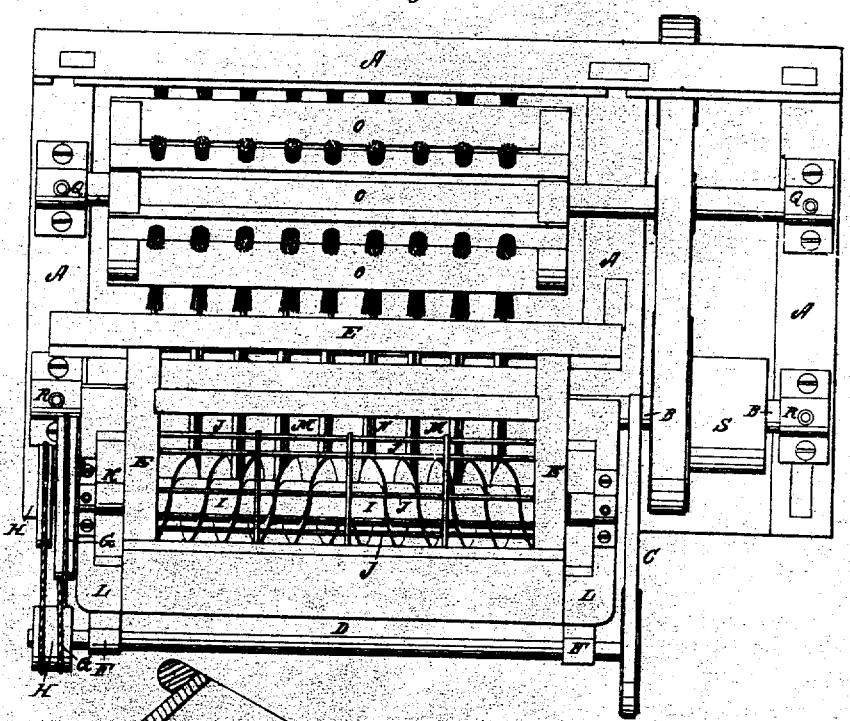
Figure 2:
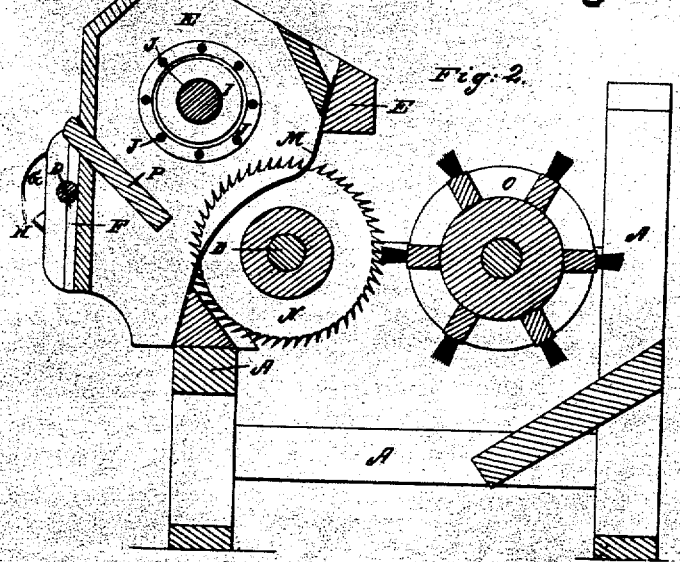

Figure 1 being a top view of a cotton-gin constructed with the aforesaid improvement, and Fig. 2 a transverse vertical section thereof.

Like letters designate corresponding parts in both figures.

The nature of the invention consists in the employment of a rotary screen placed lengthwise in the middle of the hopper or "roll-box," for the purpose of separating and receiving the boll-hulls from the "roll" while passing round it, and, in combination therewith, in the use of a spirally-winged roller or shaft revolving within said rotary screen, for the purpose of removing the hulls therefrom at the ends, arranged and operating substantially as hereinafter described.

The object of this improvement is to enable "rough cotton," or cotton picked with the bolls, to be easily and rapidly ginned without injury to the saws, and to produce a good quality of cotton therefrom—results which have not hitherto been accomplished by any other cotton-gin within my knowledge.

The portions of the machine not having immediate reference to the improvement herein described may be constructed in the usual manner. These parts comprise, principally, the frame A, saws N, ribs M, and brush O.

Lengthwise through the middle of the hopper or roll-box is situated the screen, which is constructed and arranged substantially as follows: There are two heads, K K, with central boxes or hubs prolonged outward at each end, so as to form hollow shafts or journals, upon which the screen turns in bearings L L. The hubs, rims, or peripheries of these heads are connected by spokes or radial arms, so as to leave apertures between them for the discharge of the hulls. The rims or peripheries are connected by a series of rods, J J, as represented in the drawings, placed round in a circle, so as to leave spaces between one another about seven-eighths of an inch wide, more or less. Rings, hoops, or disks may at suitable intervals pass transversely across or around these rods in order to keep them firm in the proper positions. In the drawings a single cross-disk is shown at the center of the screen, which may also be provided with a box or bearing, in which the center shaft turns, to keep the rods more firmly in their places. It is obvious that these transverse or circumfertial rings or hoops may be placed close together, (seven-eighths of an inch apart, or thereabout,) and a few long rods run lengthwise to connect the heads of the screen and firmly unite all together, as this would be a mere modification of the mode of construction adopted. Other modes of constructing might also be employed—such, for instance, as a cylindrical sheet of metal provided with numerous perforations of suitable size, or wire-cloth with suitable meshes; but I consider no method so good as that represented in the drawings and first described, and the different methods of possible construction are here mentioned in order to have it understood that I do not confine myself to any particular mode, but claim the use of the revolving screen in the hopper constructed in whatever manner. The screen should be situated very nearly in the center of the hopper; but I find it will work best when situated nearly at certain relative distances from the different sides of the hopper, although these distances may be considerably varied without much detriment, and I do not wish to confine the arrangement to any precise distances. From the center of the first inclined side of the hopper, where the roll enters and passes downward, I usually place the outer periphery of the screen at the distance of about three and three-fourth inches; from the vertical side immediately below at the distance of about three and one-fourth inches; from the adjustable seed-board P about three inches; from the extremities of the saw-teeth about an inch and a half, and from the last oblique side of the hopper, where the roll again ascends to the top, about three inches. Thus arranged, as the screen revolves in the same direction as the roll the cotton is gradually compressed as it descends, and the hulls which are in contact with the screen are forced into it between the rods, and while passing the saws the hulls are driven thereby to and into the screen, and while ascending they fall by their weight therein. Thus during the whole movement of the roll the hulls are constantly becoming separated from the fibers and working into the screen, where they cannot escape, except at the ends. The proper motion is communicated to the screen in any convenient manner. In the drawings there is represented a band, C, passing from the saw or driving-shaft B round a transferring-shaft, D, situated at the front of the machine, and from the other end of said shaft another band, G, passes to a pulley on the shaft of the screen.

In order to drive the hulls out of the screen, a shaft, I, is placed lengthwise in the center thereof, its journals passing through the hollow journals of the screen. On one end thereof is a pulley, around which a band, H, from the shaft D passes, and thereby communicates a revolving motion to the shaft I in the direction opposite to that of the screen, although this direction is not absolutely essential. Around this shaft, within the screen, is wound a strip or wing of metal or any suitable material in a spiral direction, substantially as shown in Fig. 1, there being sufficient space between the several coils thereof to freely admit the hulls. This may coil the entire length of the shaft in one direction, so as to drive all the hulls to and out at one end; but it is best to divide it in the middle and coil it in opposite directions each way to the ends, as shown in the drawings, so that half the hulls may pass out at one end and the other half at the other end. The action of the spiral wing in driving along the hulls is too obvious to need description.

What I claim as the invention of the aforesaid R. A. L. McCurdy, and desire to secure by the reissue of the Letters Patent granted originally to him, is—

1. The revolving screen situated in the hopper or roll-box, arranged and operating substantially in the manner and for the purpose herein set forth.

2. In combination with the revolving screen, the spirally-winged shaft revolving with said screen, and operating substantially in the manner and for the purpose specified.

DAVID G. OLMSTEAD.

Witnesses:
J. T. Brown,
H. C. Brown.